P. R. HAWTHORNE.
TRACTOR.
APPLICATION FILED SEPT. 5, 1919.
1,396,956.
Patented Nov. 15, 1921.
8 SHEETS—SHEET 1.
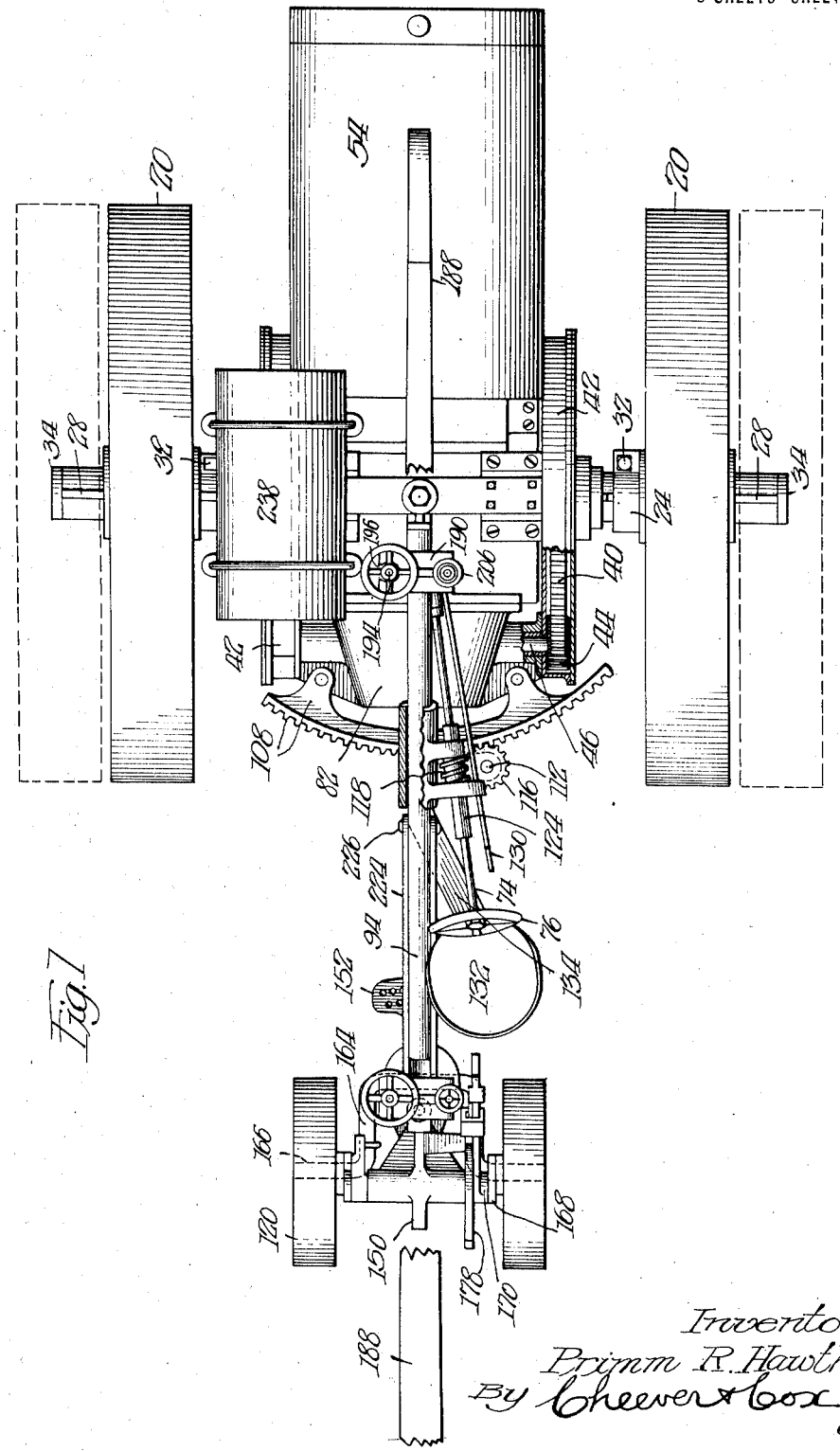

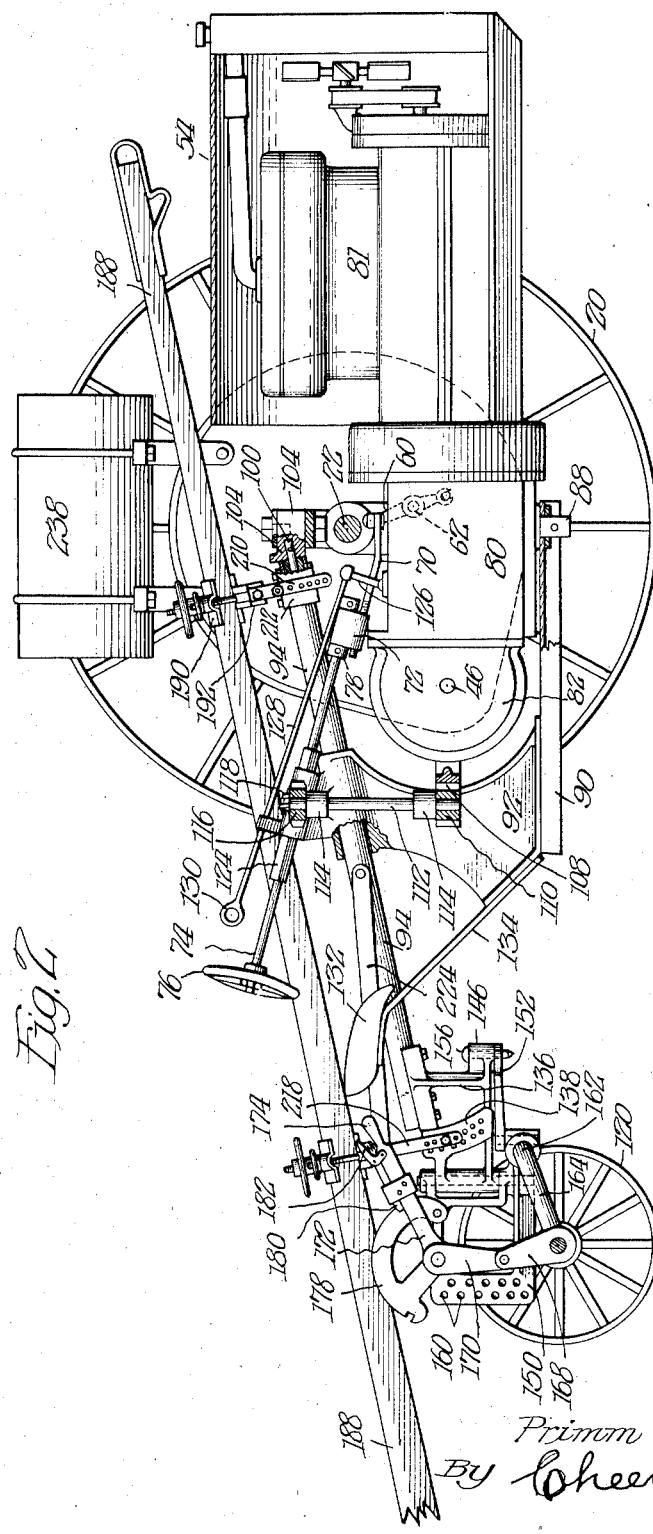

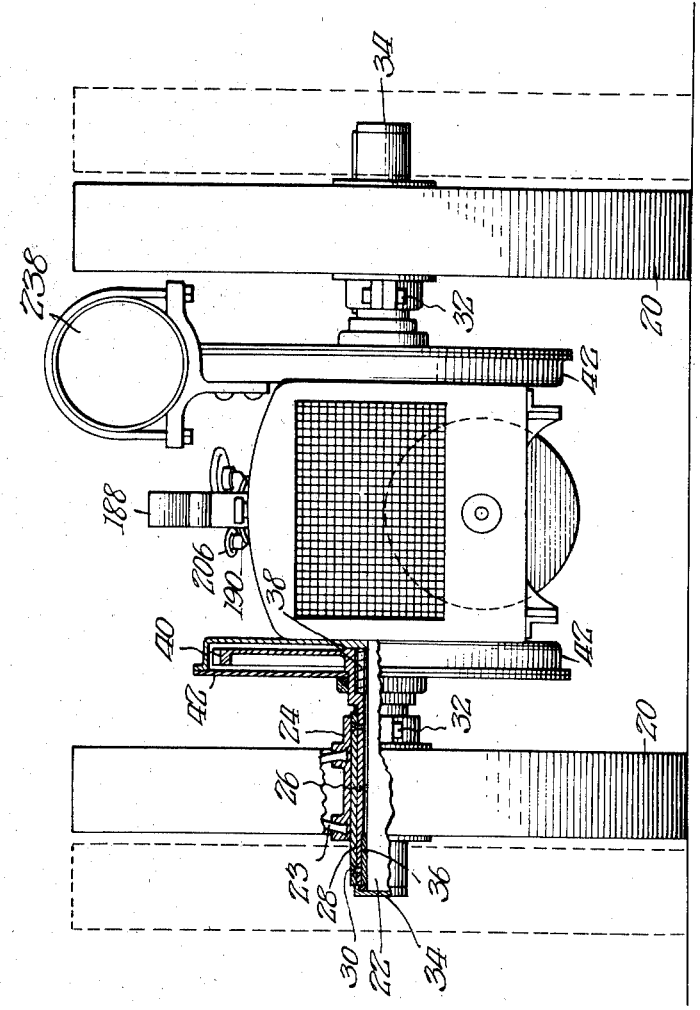

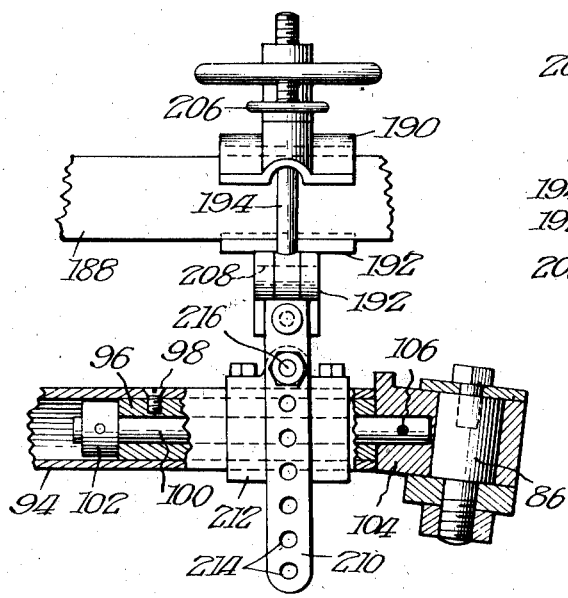
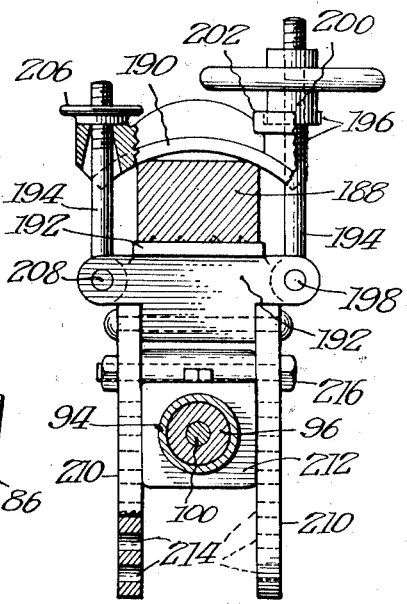
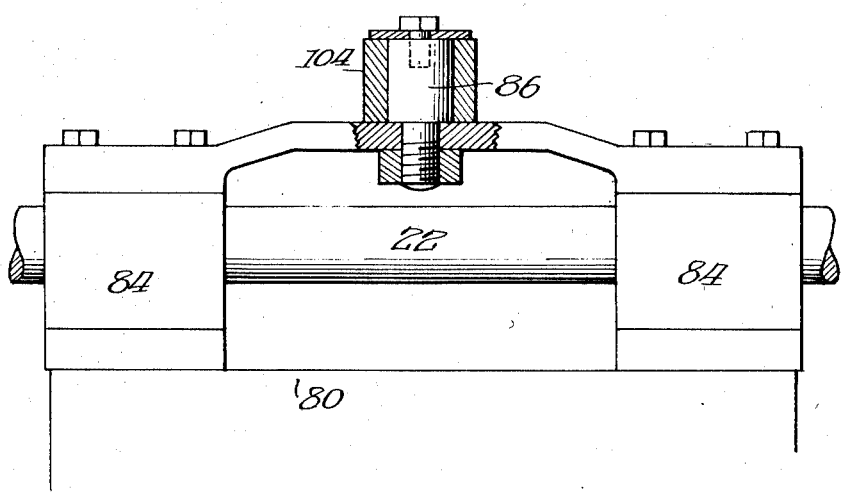

P. R. HAWTHORNE.
TRACTOR.
APPLICATION FILED SEPT. 5, 1919.
1,396,956.
Patented Nov. 15, 1921.
8 SHEETS—SHEET 5.
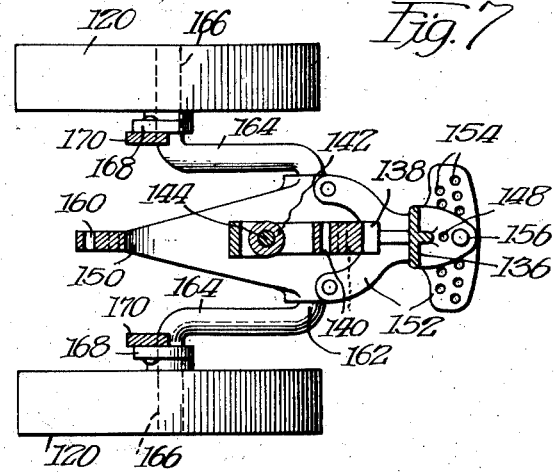
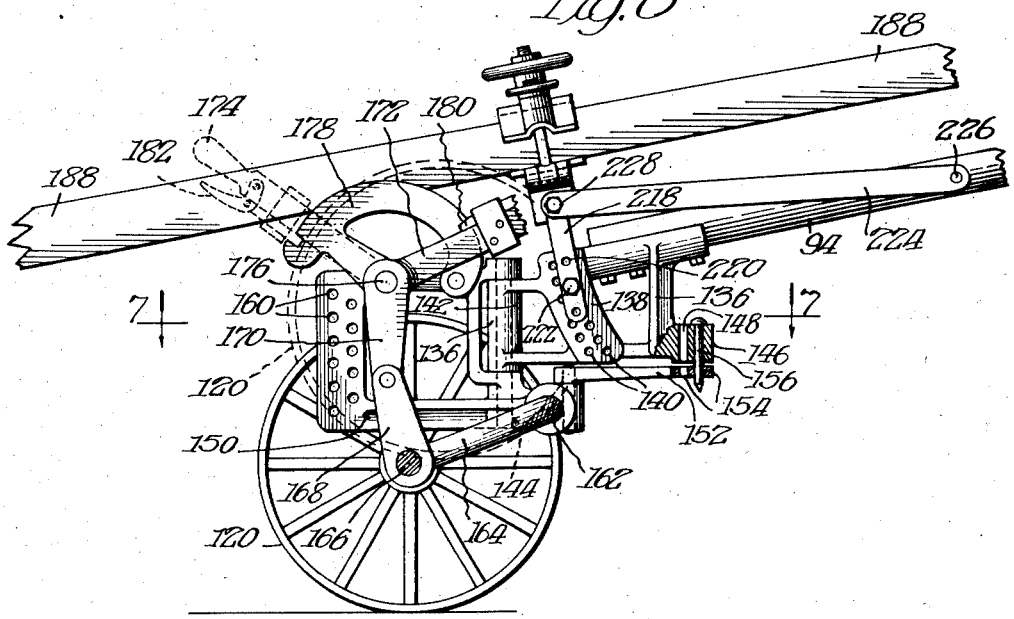

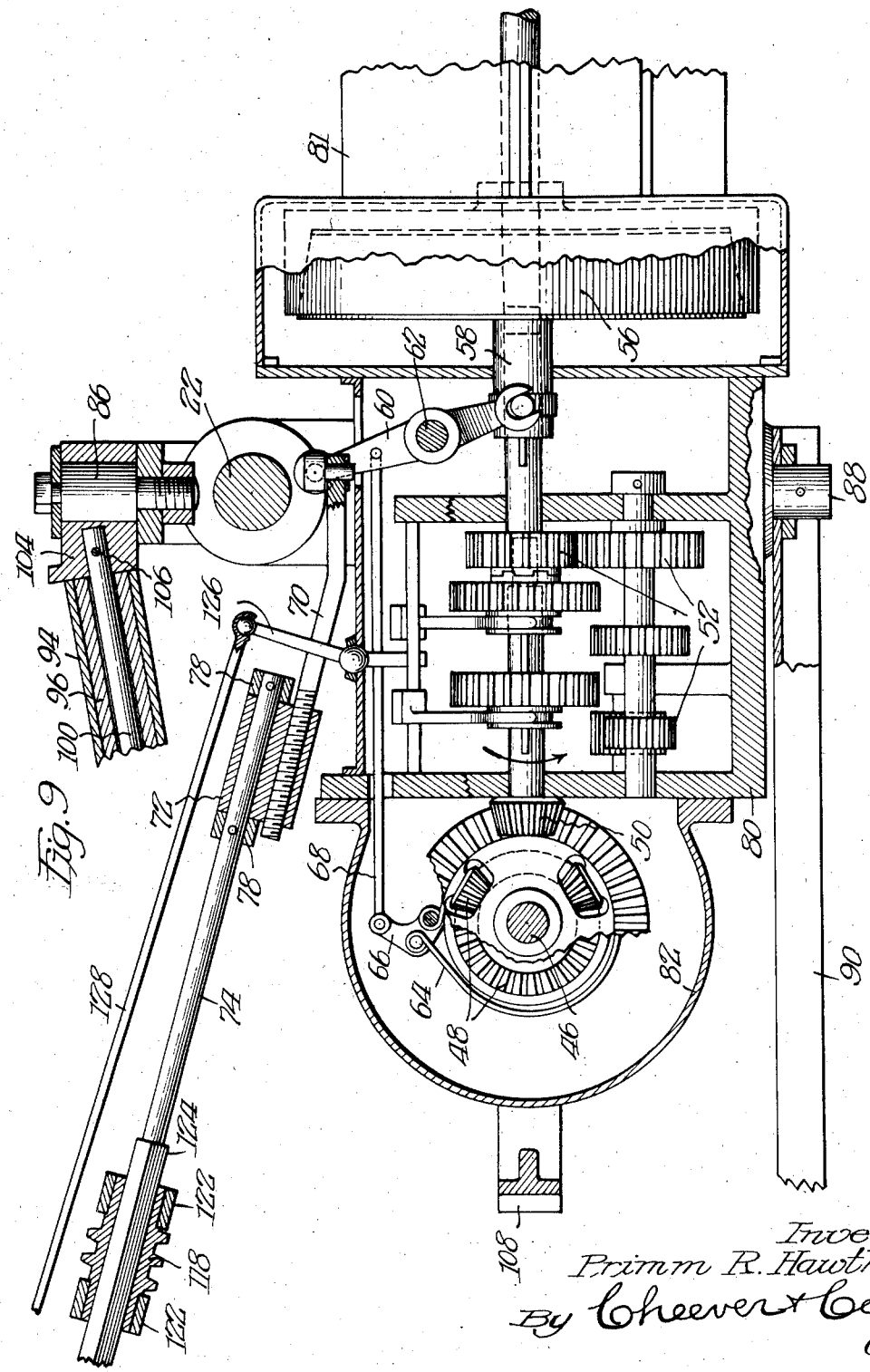

P. R. HAWTHORNE.
TRACTOR.
APPLICATION FILED SEPT. 5, 1919.

1,396,956.

Patented Nov. 15, 1921.
8 SHEETS—SHEET 7.

Inventor:
Primm R. Hawthorne,
By Cheever & Cox
attys.

P. R. HAWTHORNE.
TRACTOR.
APPLICATION FILED SEPT. 5, 1919.
1,396,956.
Patented Nov. 15, 1921.
8 SHEETS—SHEET 8.
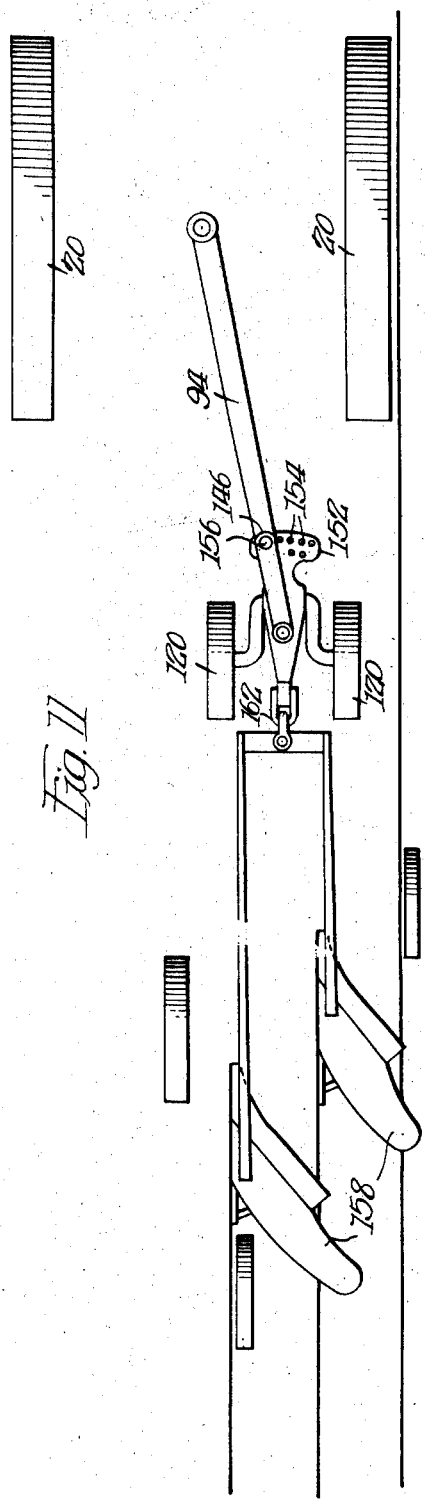
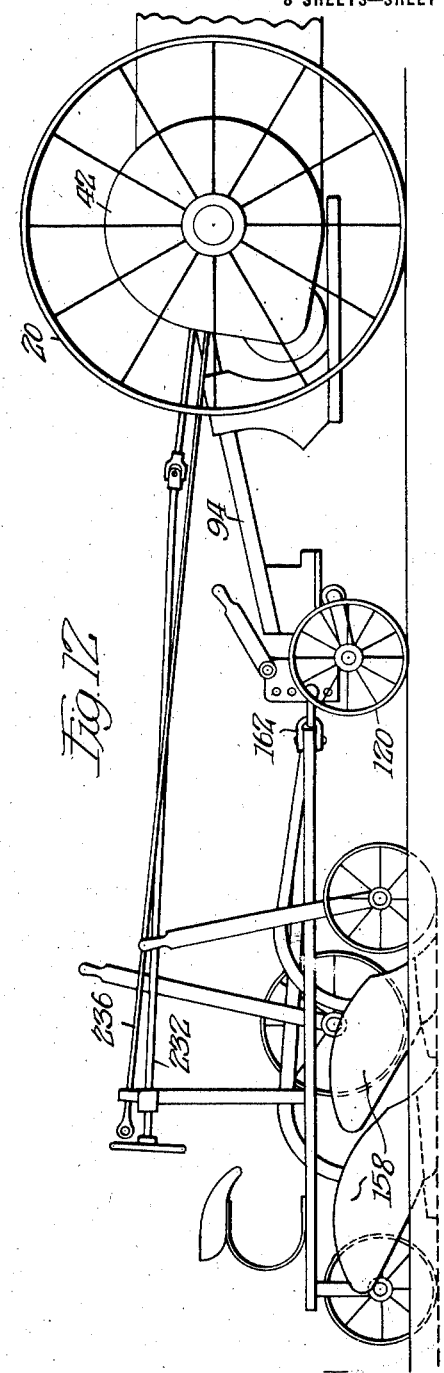
Inventor:
Primm R. Hawthorne,
By Cheever & Cox
attys.

UNITED STATES PATENT OFFICE.

PRIMM R. HAWTHORNE, OF MILWAUKEE, WISCONSIN, ASSIGNOR TO FAIRBANKS, MORSE & CO., OF CHICAGO, ILLINOIS, A CORPORATION OF ILLINOIS.

TRACTOR.

1,396,956.   Specification of Letters Patent.   Patented Nov. 15, 1921.

Application filed September 5, 1919. Serial No. 321,903.

*To all whom it may concern:*

Be it known that I, PRIMM R. HAWTHORNE, a citizen of the United States, residing at Milwaukee, State of Wisconsin, have invented a certain new and useful Improvement in Tractors, of which the following is a specification.

This invention relates to tractors, primarily for use in connection with farm tools and implements of various sorts. Its object is to provide a tractor which is self-contained so that it is operable, by itself, without anything attached to it when occasion requires, and yet is so constructed that it may be attached to and manipulated with all sorts of farm implements, such as cultivators, plows, wagons, and so forth, which are primarily designed for horse-operation without in any way changing or destroying the normal horse-attaching parts of such implements, without providing any special attaching devices other than those normally carried by the tractor itself, and without removing any parts of the normal tractor.

To further explain the object of this invention, it should be noted that at the present time farmers are generally equipped with working apparatus designed for propulsion by horses, and as long as they have such equipment they are apt to want to, from time to time, use such equipment with horses. Tractor engines have heretofore been in use for drawing such equipment, but they have uniformly required the temporary or permanent removal or modification of the horse-attaching devices on such equipment, with or without the addition of supplemental special attaching devices, before the tractors of the prior art can be applied. Furthermore, tractors of the present prior art require substantial modification in their own construction and arrangement of parts before they can be used properly to draw such normally horse-equipped implement. This invention provides a tractor manipulatable by itself, when desired, and directly attachable to horse-drawn equipped implements without modification of the latter, or special intervening equipment.

Further objects of the invention are to provide a tractor for use in row crops, and to provide a tractor in which the center of gravity is low.

The invention consists of mechanism for carrying out the foregoing and other objects, which can be easily and economically made, which is compact in form, satisfactory in operation, and is not liable to get out of order. The invention more particularly consists in features and details hereafter fully pointed out in the specification and claims.

Referring to the drawings, in which the same numerals represent like parts throughout the several views, Figure 1 is a plan view of a tractor illustrating this invention in its preferred form, showing broken portions of the tongue of an implement attached to and adapted to be drawn by the tractor.

Fig. 2 is a side view of the mechanism of Fig. 1.

Fig. 3 is a front view of the mechanism, taken from the right hand end of Figs. 1 and 2.

Fig. 4 is a side view, partially in section, showing the details of the mechanism by which the tongue of the drawn vehicle is clamped to the tractor, and showing the pivoting devices for the rear truck of the tractor proper.

Fig. 5 is an end view of the parts of Fig. 4, looking at the right hand side of that figure.

Fig. 6 is a rear view at right angles to Fig. 2, showing in detail the central portion of the main axle or shaft of the tractor, and the suspension devices attached thereto, the vertical pivot by which the rear truck is attached being shown in section.

Fig. 7 is a plan view taken on the line 7—7 of Fig. 8.

Fig. 8 is a side view of the preferred form of the rear truck of the tractor.

Fig. 9 is a vertical sectional detail view taken right through the central portion of Fig. 1, showing the fly-wheel and housing, clutch and the clutch-operating mechanism, and transmission gearing.

Figs. 11 and 12 are plan and side views of the tractor with plow attached, showing in Fig. 11 the plow carried in line with the tractor but parallel to one side of and to its central axis.

Figure 10:
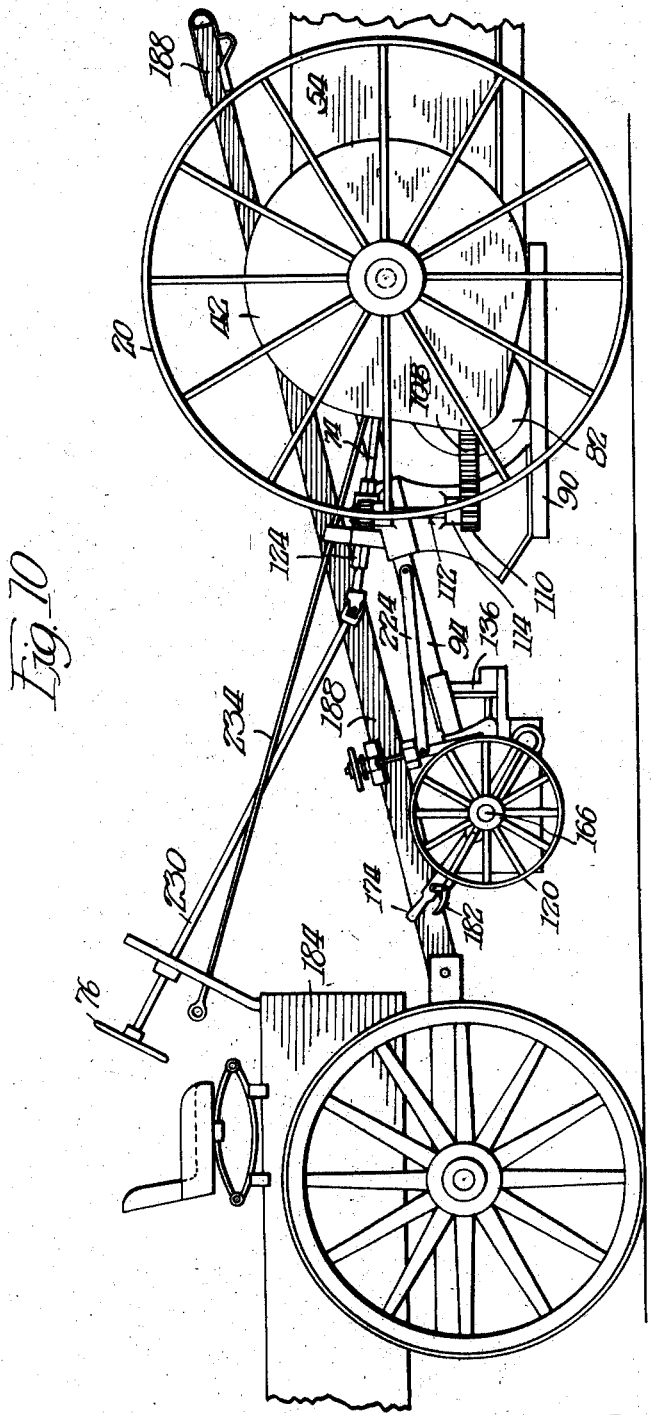
Fig. 10 is a side view of the tractor and the front portion of the farm implement, viz., a wagon, attached thereto, the tractor mechanism being in a changed position from that of Fig. 2, rendered necessary and desirable when such an attachment is made.

The tractor proper is, of course, carried on wheels. In the particular case here illustrated, these are relatively large, wide tired wheels 20, of the type common in the art, adapted to travel over soft broken ground, and they rotate about the central axis of the main shaft 22, being connected thereto by special mechanism, whereby they can be moved longitudinally of the shaft so as to operate successfully between row crops of different widths in different fields.

The method of securing the wheels 20 upon the shaft 22 is clearly shown in Fig. 3. Each hub 24 is mounted upon a tubular sleeve 26, which sleeve has attached to it a spline or feather key 28 (fastened by screws 30, Fig. 3). This spline or key locks the wheel against rotation on the sleeve, but permits longitudinal adjustment of the wheel lengthwise of the sleeve between the dotted line and full line positions of Fig. 3. The inside end of each hub is split and equipped with a transverse bolt 32, which is tightened up to lock the hub, and consequently the wheel, in any desired selected position along the sleeve 26.

Rigidly attached to the end of shaft 22 by any suitable means, not shown, is an enlargement or plate 34 which keeps sleeve 26, and consequently wheel 20, from slipping off from shaft 22. Shaft 22 is stationary, and sleeve 26 revolves upon it. In the particular case here illustrated, the outer end of the sleeve is provided with a bushing 36 and the inner end of the sleeve is provided with an anti-friction bearing 38. On the inner end of the sleeve 26 is rigidly secured, by any suitable means, a gear 40 which transmits motion given it, by means hereafter described, to the sleeve and thence to the adjacent wheel 20. In the particular case here illustrated, the gear 40 is inclosed within an oil-tight and dustproof-case 42.

Also inclosed in gear case 42 is a pinion 44, meshing with the gear 40 (Fig. 1). Each pinion 44 is on a shaft 46, whose opposite end enters the differential mechanism 48 without novelty and of common commercial form, and therefore not described in detail. Motion is transmitted from the engine to this differential mechanism 48 through a pinion 50, controlled by a change speed and reverse gearing 52. In turn, power is transmitted from the engine 81, located within the hood 54, through fly-wheel and clutch mechanism 56 to this change speed mechanism 52, all these parts being well known in the art, and, therefore, not described in detail. They are all as shown inclosed in dustproof oil retaining cases. These parts together will be referred to as the power plant.

The clutch device 56 is thrown in and out of operation through the reciprocation of a sleeve 58, manipulatable by a rocker arm 60, pivoted at 62. A brake band 64, adapted to control the tractor, is mounted around the housing or case of the differential gear mechanism 48, and is operable through the usual lever mechanism 66. This lever 66 is connected to the upper portion of clutch lever or rocker arm 60 by a rigid rod 68, so that movement of lever 60 moves lever 66.

The upper end of the rocker arm 60 is connected to and driven by an upwardly inclined rod 70, preferably adjustably attached to a non-rotatable block 72, in which revolves shaft 74, carrying at its upper end steering wheel 76. Shaft 74 is held in against longitudinal movement with reference to block 72 by collars 78, rigidly attached to rod 74 by any suitable means. The result of this construction is that hand wheel 76 and shaft 74 may be rotated freely for the purpose of manipulating the steering mechanism to be hereafter described, without affecting the rod 70, but that the wheel and the shaft 74 may be reciprocated backward and forward to manipulate rod 70, and thence rocker arm 60 and attached parts to engage and disengage the clutch mechanism 56, and to in extreme forward position set the brake mechanism 64.

The change speed gear case 80, the motor 81 under hood 54, and differential case 82 are all connected together into one substantially unitary structure and are suspended on shaft 22 by the bracket bearings 84 (Fig. 6). To the parts just described and in a vertical line through the central axis of the shaft 22 are secured two vertical pivots 86 and 88, the former above, the latter below the shaft 22. To these pivots are attached a frame mechanism carrying normally the rear truck of the tractor which is, under certain conditions of operation, required in order that the tractor may be steered.

This frame mechanism consists of two parts; a horizontal member 90 pivoted at 88 for rotation in a horizontal plane only, and carrying at its swinging end an upright member 92; an inclined member 94, rotatable, for reasons hereafter set forth, in the upper portion of upright member 92, and also connected to pivot 86 for horizontal rotation about it. The reason why member 94 is rotatable on itself in member 92 is that it carries at its rear end the truck shown in detail in Fig. 8, and such rotation is required that the wheels of the truck and the wheels 22 of the tractor proper may adjust themselves to unevenness of the ground when in contact therewith. The mechanism by which the forward end of member 94 is attached to the tractor proper is shown in detail in Figs. 4 and 5. Broadly speaking, it is one type of universal joint. In the particular form of device shown in the drawings, member 94 is made tubular with a sleeve 96 secured inside the forward end by any suitable means, such for instance as screws 98. Inside this sleeve 96 rotates a short shaft 100, held against longitudinal movement at one end by a collar 102 and at its outer end by abutting against a block 104, revoluble in a horizontal plane about pivot 86, heretofore referred to. The outer end of shaft 100 is fastened to this block by any suitable means, as a pin 106. The result of this construction is that as block 104 rotates about pivot 86, member 94 is swung in a substantially horizontal plane about that pivot, while, on the other hand, member 94 can independently rotate about horizontal shaft 100.

Conveniently attached to the rear portion of the differential housing 82 is a horizontal gear segment 108 with which meshes a pinion 110, mounted on a shaft 112, journaled in bearings 114, on vertical member 92, heretofore referred to. The upper end of this shaft 112 carries a gear driven by rotation of rod 74 and hand wheel 76. In the particular case here illustrated—and preferably—this gear is a worm gear 116, meshing with worm 118 on shaft 74, the worm type of device being chosen on account of its well known irreversible characteristic. From the foregoing construction it will be seen that when the operator rotates wheel 76 and consequently shaft 74, he rotates pinion 110 along gear segment 108.

Mounted on the lower or rear end of member 94 is the rear truck of the tractor, carried by wheel mechanism 120, bearing on the ground, and, therefore, giving the tractor, when unloaded, steering ability in the ordinary manner in which any vehicle of three or more wheels in different planes is steered. Such steering is effected by the operator through rotation of handwheel 76 and shaft 74 to revolve pinion 110 to cause it to travel backward and forward, as required, along segment 108.

The worm 118, heretofore referred to, carried by shaft 74, is mounted in external bearings 122, rigidly sustained by upright member 92, and so held against longitudinal movement with reference to said member 92. The shaft 74 is provided with a non-circular member 124 which slides through worm 118 and thus permits shaft 74 to reciprocate through the worm for purposes heretofore described and yet insures the rotation of the shaft, rotates the worm whenever the operator turns hand wheel 76, regardless of the longitudinal position of the shaft 74.

The result of the construction relating to shaft 74, heretofore described, is that the operator can, while manipulating handle 76, a single instrument in his hand, steer the tractor by merely rotating that wheel, and can engage and disengage the clutch by reciprocating it, and can, by extreme reciprocating movement of it, set the brake.

The gear shift mechanism 52 is conveniently operated from a point near the hand wheel 76 by means of a lever 126, engaging the gear shift mechanism, driven by a rod 128 having an operating handle 130 adjacent to, but not in any way connected with wheel 76. A seat 132 is conveniently arranged for the use of the operator. Its method of mounting is immaterial. In the particular case here illustrated, it is carried by support 134, from mechanism 90—92.

Rigidly attached to the lower or rear end of inclined member 94 by any suitable means, is a rectangular bracket 136 having extending down its middle an integral plate 138, bearing two rows of staggered perforations 140, whose use will be hereafter explained. In the portion of the bracket 136 which is beyond the end of member 94 is a tubular vertical bearing 142 inclosing vertical shaft 144. At the opposite end of frame 136 is a horizontally extending lug 146 bearing perforations 148. Extending beyond this bracket 136 is the rear truck frame 150 also engaged by shaft 144 so that the bracket and frame are pivoted together about shaft 144. Extending from rear truck frame 150 and underneath bracket 136 is a horizontal bracket 152, carrying two rows of staggered perforations 154 registering with perforations 148, heretofore referred to, so that a bolt 156 may be selectively inserted in one of the perforations 148 and an opposite perforation 154, to angularly position the bracket 138 and attached parts with reference to the rear truck frame 150. The object of this positioning is to lock the parts in position when it is desired to run the rear truck in alinement with but to one side of the central axis of the tractor proper, as shown in Fig. 11—this being desirable at times when the tractor is pulling an implement, such as plow 158, and it is because of furrow conditions, or otherwise, desirable to have it move in a line parallel to but to one side of the path of the center of the main tractor.

On the rear of rear truck frame 150 are preferably placed a plurality of perforations 160, designed to selectively accommodate the attaching devices 162 of different sizes or types of plows 158 or other devices not provided with rigid tongues or thills, and, therefore, capable of flexible connection behind and hauling by the tractor without lifting the wheels of the tractor truck off from the ground, as is necessary under other conditions herein shown and described. Figs. 11 and 12 show a plow so attached to the tractor.

When the wagon having a tongue or thill is attached to the tractor, it is, for obvious reasons, necessary in order to effect ready steering of the mechanism that the wheels 120 of the rear truck of the tractor be lifted off from the ground. This is accomplished by the mechanism shown in Fig. 8. A U- shaped crank shaft has its shaft member proper journaled in frame 150 so that its crank arms 164 lie on and swing clear of the sides of frame 150, while the crank pins 166 carry the respective wheels 120. Each crank pin 166 is connected to a link 168, which is in turn connected to one arm 170 of a forked bell crank whose opposite single arm 172 terminates in an operating handle 174, graspable by the operator to rotate the bell crank about pin or shaft 176 to move the mechanism and consequently the wheels 120 from the position of Figs. 2 and 8 to that of Fig. 10. The lever 172 is selectively lockable in each of these positions by any suitable means, as for instance the stationary quadrant 178, engageable by the latch dog 180, manipulatable in the ordinary manner by the use of the usual operating handle 182, common in the arts.

It will therefore be seen that the wheel mechanism 120 is, while elevatable as described, practically permanently attached to the main mechanism. That is to say it is not taken off and left in the tool shed or at the road side every time a vehicle is attached to be hauled.

When the wagon 184, having a tongue 188 is to be hauled by the tractor, the tongue is, by the mechanism of this invention, detachably secured to the tractor without alteration or change. This is accomplished by attaching to the tongue at points spaced apart about equal to the distance between plate 138 and pivot 86, clamp devices 190–192, shown in detail in Figs. 4 and 5. In the particular form here illustrated these take the form of top plates 190 passing over the tongue and detachably securable in place thereon through the agency of vertically projecting rods 194, pivoted to the bottom plates 192 on the underside of the tongue.

In order to make this clamp very quick acting in attachment and detachment, the right hand rod 194, as viewed in Fig. 5, is provided with a side slot 196 through which said rod 194 can be swung to the right about pivot 198, the moment the lower end of wheel-hub 200 clears the upper end 202 of housing 204 integral with plate 190. In order to effect such release it is also more or less necessary to partially loosen screw nut 206 on left hand rod 194, whereupon left hand rod 194 and plate 190 swing to the left about pivot 208 and thus leave the tongue free of the clamp.

The clamping mechanism just described located adjacent to pivot 198 and which is shown in detail in Figs. 4 and 5, is provided with two parallel downwardly extending bars 210 lying on each side of a block 212 on the forward end of rod 94. These bars 210 are provided with longitudinally placed perforations 214 through which one or more bolts 216 may be placed for tightening these bars 210 together about block 212 and thus positively securing the tongue 188 to the tractor at this point. A multiplicity of these perforations 214 are provided so as to allow for different adjustments of the device in a vertical plane to accommodate different positions which the tongues of different vehicles will necessarily assume when attached to a given tractor.

Similarly, the other clamp 190–192 is provided with downwardly extending parallel rods 218 lying on opposite sides of plate 138, these rods being provided with a series of perforations 220 adapted to be selectively engaged by a bolt 222 placed through one of them, and a selected perforation in plate 138, the result being that by properly picking the holes through which bolt 222 is inserted, this clamp may be so adjusted to each particular wagon tongue which is brought in proximity to it that wheels 120 of the truck of the tractor will initially be, after attachment, in the position of Figs. 2 and 8, and may then be folded up to the position of Fig. 10, in the manner heretofore described.

In order to reduce the draft strain on bolts 216 and 222 and to prevent the bending under draft strain of members 210 and 218, a pair of draft links 224 are provided on opposite sides of member 94 and pivoted thereto at 226. The opposite ends of these links are pivotally connected at 228 as near as possible to the rear clamp 190–192.

In the structures shown in Figs. 10 and 12, the steering shaft here designated respectively 230 and 232, corresponding to shaft 74, is shown lengthened out so that the operator may sit upon the seat of the implement drawn by the tractor. This may be accomplished by making the steering shaft telescopic. The gear shift rod 128, here lettered 234 and 236, may be correspondingly treated. The operator will, however, usually and preferably, occupy seat 132 as heretofore described, unless he is required to sit on the plow of Fig. 12 to operate it, or to sit on the wagon seat for some special reason.

It will be noticed that the two wheels 120 are from outside the edge of one wheel to the outside edge of the other—in effect a single very broad wheel. Whether they be considered as such a single wheel or two wheels, they must, when used, to steer the tractor, be kept on the ground, and it is, as heretofore indicated, for this reason that the universal joint, shown in Fig. 4, is provided, so that member 94 can rotate about its own axis as well as swing in a circle about vertical pivot 86. When, however, only a single relatively narrow wheel is used for carrying the rear truck, this rotation about the axis of member 94 is unnecessary and may be omitted without departing from this invention.

The adjustment of the main truck wheels 20 longitudinally of their axes under the control of bolts 32 is important, for the reason that it enables these wheels to be so placed that they travel outside of two rows of crops to be cultivated, while the low hung engine mechanism passes between these rows without injuring the crop. This enables this tractor to draw between the rows a narrow cultivator which will not injure the crop, and thus produce as satisfactory cultivating results as is possible with the objectionable high center of gravity tractors heretofore used. The truck wheels 120 are, for this very reason, made of a total width of substantially the width of the engine mechanism of the tractor only, so that in the operation just described, the wheels 120 follow along between the rows of crops without injuring them. Obviously, a cultivator which is itself designed to cultivate between two or more parallel rows straddling any intervening row or rows not to injure them may be successfully hauled by this tractor for the same purpose and result.

The engine described is provided with gasolene or other fuel from a suitable supply tank, as 238.

Having thus described my invention, what I claim as new and desire to secure by Letters Patent, is:—

1. In mechanism of the class described, the combination of a tractor body including power plant and wheels, a frame pivoted on the tractor body extending therefrom, truck wheels normally supporting the free end of said frame, means for selectively varying the angularity of the frame with the tractor body, vertically adjustable means rigidly attaching the relatively long rigid tongue (or the like) of a vehicle in related angular position in a plane vertical to the frame so that it necessarily swings in unison with said frame about the pivot at the tractor body, and means for temporarily elevating the truck wheels from the ground.

2. In mechanism of the class described, the combination of a tractor body including power plant and wheels, a frame pivoted on the tractor body extending therefrom, truck wheels normally supporting the free end of said frame, means for selectively varying its angularity of the frame with the tractor body, vertically adjustable means rigidly attaching the relatively long rigid tongue (or the like) of a vehicle in selected angular position in a plane vertical to the frame above the frame so that it necessarily swings in unison with said frame about the pivot at the tractor body, and means for temporarily elevating the truck wheels from the ground.

3. In mechanism of the class described, in combination with a tractor body including a power plant and supporting wheels, an outwardly extending frame member pivoted to the tractor body to swing in a horizontal plane with reference thereto, steering means for selectively changing the angularity of the frame with reference to the tractor body, a member carried by said frame, rotatable in a vertical plane with reference to said frame and truck wheels supporting the free end of said member, and means for changing the horizontal angular position of said truck wheels with reference to said member.

4. In mechanism of the class described, in combination with a tractor body including a power plant and supporting wheels, an outwardly extending frame member pivoted to the tractor body to swing in a horizontal plane with reference thereto, steering means for selectively changing the angularity of the frame with reference to the tractor body, a member carried by said frame rotatable in a vertical plane with reference to said frame and truck wheels supporting the free end of said member, means for changing the horizontal angular position of said truck wheels with reference to said member, and means for elevating and depressing said truck wheels with reference to said member.

5. In mechanism of the class described, in combination with a tractor body including a power plant and supporting wheels, an outwardly extending frame member pivoted to the tractor body to swing in a horizontal plane with reference thereto, steering means for selectively changing the angularity of the frame with reference to the tractor body, truck wheels supporting the free end of said frame, and means for changing the horizontal angular position of said truck wheels with reference to said member.

6. In mechanism of the class described, the combination with the end of a supporting member 94, a vertical frame member attached thereto and equipped with means of attachment to the tongue of the vehicle, a vertical pivot on said frame member, a truck frame pivoted on said pivot to swing in a horizontal plane, and means for selectively locking the two frames in different angular positions with reference to each other.

7. In mechanism of the class described, the combination with the end of a supporting member 94, a vertical frame member attached thereto and equipped with means of attachment to the tongue of the vehicle, a vertical pivot on said frame member, a truck frame pivoted on said pivot to swing in a horizontal plane, means for selectively locking the two frames in different angular positions with reference to each other, and wheel mechanism supporting the truck frame, but mounted for movement with reference thereto in a vertical plane.

8. In mechanism of the class described, the combination with the end of a supporting member 94, a vertical frame member attached thereto and equipped with means of attachment to the tongue of the vehicle, a vertical pivot on said frame member, a truck frame pivoted on said pivot to swing in a horizontal plane, means for selectively locking the two frames in different angular positions with reference to each other, wheel mechanism supporting the truck frame, but mounted for movement with reference thereto in a vertical plane, and means for selectively locking said wheels in two positions, one where they support the truck frame, and the other where they do not.

9. In mechanism of the class described, in combination a tractor body including power plant and wheels; a frame pivoted to the tractor body extending outwardly and downwardly therefrom; truck wheels supporting the free end of said frame; means for selectively varying the angularity of the frame with reference to the tractor body; means carried by said angularly inclined frame for rigidly attaching thereto the rigid tongue of the vehicle so that said tongue necessarily swings in unison with the frame about the pivot of the tractor body, means in said attaching means for varying the angularity of tongue to the frame before the former is secured in place thereon, and means for temporarily elevating the truck wheels from the ground.

In witness whereof, I have hereunto subscribed my name in the presence of two witnesses.

PRIMM R. HAWTHORNE.

Witnesses:
 LILLIAN ROE,
 FRANK BOYER.